United States Patent [19]

Nishiki et al.

[11] 4,456,088
[45] Jun. 26, 1984

[54] UNMANNED VEHICLE TRAVEL CONTROL DEVICE

[75] Inventors: Tetsuya Nishiki; Takao Kamide, both of Kamakura, Japan

[73] Assignee: Kabushiki Kaisha Komatsu Seisakusho, Tokyo, Japan

[21] Appl. No.: 271,651

[22] Filed: Jun. 8, 1981

[30] Foreign Application Priority Data

Jun. 11, 1980 [JP] Japan .............................. 55-81480[U]
Jul. 30, 1980 [JP] Japan ............................ 55-107950[U]

[51] Int. Cl.³ .............................................. B62D 1/24
[52] U.S. Cl. .................................... 180/168; 318/587; 324/247
[58] Field of Search ................ 180/168, 169; 324/247, 324/207; 318/587

[56] References Cited

U.S. PATENT DOCUMENTS

| | | | |
|---|---|---|---|
| 3,009,525 | 11/1961 | De Liban | 180/168 |
| 3,136,944 | 6/1964 | Hafner | 324/247 |
| 3,757,887 | 9/1973 | Moore et al. | 180/168 |
| 4,307,329 | 12/1981 | Taylor | 180/168 |
| 4,310,789 | 1/1982 | Mank et al. | 180/168 |

Primary Examiner—David M. Mitchell
Attorney, Agent, or Firm—Spensley, Horn, Jubas & Lubitz

[57] ABSTRACT

A vehicle is guided along a desired path forwardly and backwardly by electromagnetically detecting deflection and attitude angle of the vehicle with respect to a guidance cable carrying an alternating current and producing a magnetic field.

The deflection of the vehicle thus detected is compared with a predetermined deflection value from the guidance cable to produce an attitude angle setting signal, which is subsequently compared with the detected attitude angle to produce a steering control signal according to which the vehicle is controlled to run a desired path.

4 Claims, 13 Drawing Figures (a)

(b)

UNMANNED VEHICLE TRAVEL CONTROL DEVICE

BACKGROUND OF THE INVENTION

This invention relates to an unmanned vehicle so constructed that the travel of the vehicle is controlled by a signal from a guidance cable buried near the surface of a travel course.

It has been in practice for the travel control of an unmanned vehicle that an alternating current flows through a guidance cable laid along the travel course. A magnetic field generated by the guidance cable is detected by two pick-up coils provided on the vehicle body, and the steering of the vehicle is controlled according to the difference in the induced voltage between these two pick-up coils. For a stable travelling of the vehicle, a pick-up coil should be installed in front of the rigid wheel with respect to the travel direction. Accordingly, a pair of forward movement pick-up coils and a pair of backward movement pick-up coils are provided, and these pick-up coils are changed as the vehicle travels forwardly or backwardly. When such unmanned vehicle runs forward, the larger the distance between the pick-up coil and the axle of the rigid wheel, the more stable the travel of the vehicle becomes. In the prior art, since this distance is structurally limited, the forward movement pick-up coils are installed with a predetermined angle with respect to the center line of the vehicle body so as to detect an attitude angle. However, by such pick-up coils, only the deflection of a vehicle from the guidance cable or the combined value of the deflection and attitude angle of the vehicle is detected. Moreover, the detected value of the pick-up coils, i.e., the induced voltage, tends to be affected by the variation of the current flowing through the induction cable and inductive disturbances, e.g., change of permeability around the cable, thereby making an accurate travel control difficult.

SUMMARY OF THE INVENTION

The primary object of this invention is to provide an unmanned vehicle travel control device which enables a very stable travel control of an unmanned vehicle running forward or backward.

Another object of the invention is to provide an unmanned vehicle travel control device in which mutually orthogonal components in three directions of the induction field generated from a guidance cable are detected by a single detector and the steering control is performed based on the detected values.

Still another object of the invention is to provide an unmanned vehicle travel control device wherein detectors are provided in the front and the rear parts of the vehicle body to detect deflection of the vehicle from the guidance cable, an attitude angle is calculated based on deflection signals from each detector, and the steering control is performed according to the attitude angle and the deflection signal indicating the deflection of the front side of the vehicle with respect to the travel direction. Still another object of the invention is to provide a magnetic field detector wherein a pair of coils are arranged in parallel in each of mutually orthogonal three axial directions, the paired coils in each axial direction are mutually incorporated and the two coils in each pair are connected.

Still another object of the invention is to provide a magnetic field detector arranged in such a way that the axial directions of three coils are made mutually orthogonal and the centers of the coils are brought to coincide substantially.

Still another object of the invention is to provide a magnetic field detector in which the axial directions of two coils are made mutually orthogonal and the centers of the coils are brought to substantially coincide.

According to the invention, a deflection signal and an attitude angle signal are obtained by detecting the deflection of the vehicle from the guidance cable and attitude angle, an attitude angle setting signal is formed based on the deviation between the deflection signal and the deflections setting signal, a steering angle setting signal is formed according to the attitude angle setting signal and the attitude angle signal, and the steering control is performed based on said steering angle setting signal.

DETAILED DESCRIPTION OF THE INVENTION

Figure 1:
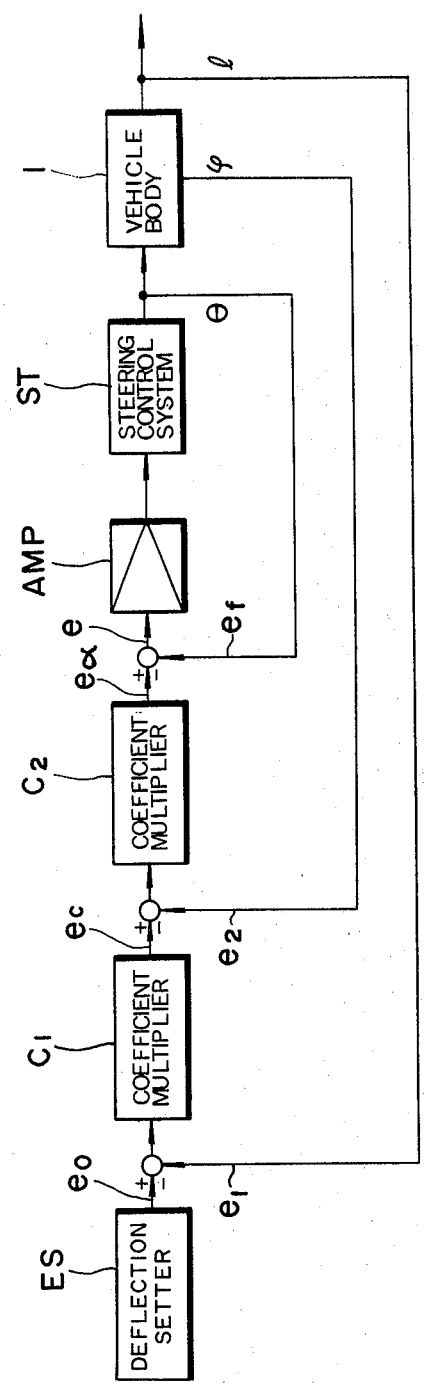
FIG. 1 is a block diagram showing an embodiment of an unmanned vehicle travel control device according to the invention.

Referring to FIG. 1, a deflection signal $e_1$ is determined by detecting the deflection l of a vehicle body 1 from a guidance cable and the deviation of said deflection signal $e_1$ from a deflection setting signal $e_0$ that is ($e_0 - e_1$), outputted from a deflection setter ES is taken as a set value of an attitude angle $\phi$. This set value is multiplied by a proper coefficient at a coefficient multiplier $C_1$, and an attitude angle setting signal $e_c$ is produced. Further the attitude angle signal $e_2$ is determined by detecting the attitude angle $\phi$ of the vehicle body 1, and the difference between the attitude angle signal $e_2$ and the attitude angle setting signal $e_c(=e_0-e_1)$ is taken as a set value of the steering angle. This set value is multiplied by a proper coefficient at a coefficient multiplier $C_2$, and a steering angle setting signal $e_\alpha$ is produced. Then, the difference between the steering angle setting signal $e_\alpha$ and a feedback signal $e_f$ corresponding to the steering angle $\theta$ from a steering control system ST is amplified at an amplifier AMP and is fed to the steering control system ST for the steering control.

Figure 2:
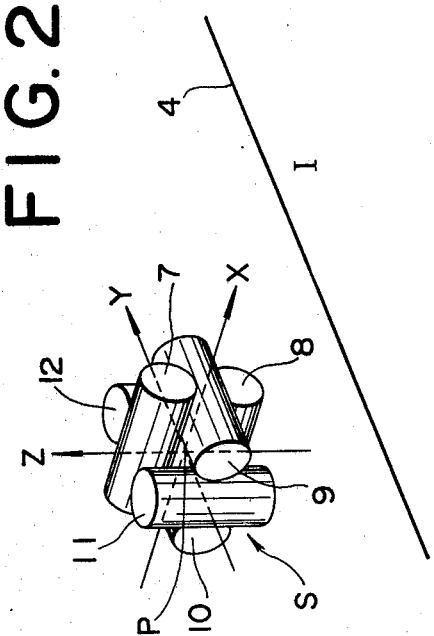
FIG. 2 is a perspective view showing an embodiment of a magnetic field detector to be used in the unmanned vehicle travel control device according to the invention.

Referring now to FIG. 2, a magnetic field detector S consists of three pairs of coils 7 and 8, 9 and 10, and 11 and 12 arranged in mutually orthogonal directions X, Y, and Z, and these coils have the same shape and the same electro-magnetic characteristics. The coils 7 and 8 along the direction of the X axis are arranged in parallel spaced slightly farther apart than the length of the outer diameter of the coil. These coils 7 and 8 have the same polarity arrangement and are connected in series. Other coil pairs 9 and 10, and 11 and 12 along the Y and Z axes are arranged in the same manner as that in the coil pair 7 and 8. These three coil pairs are incorporated and engaged with each other as shown in FIG. 2 to form the magnetic field detector S.

Each coil pair of the magnetic field detector S detects a corresponding induced current, i.e., the coils 7 and 8 detect X component of the magnetic field, the coils 9 and 10 detect Y component and the coils 11 and 12 detect Z component. Each paired coils are connected in series with their winding direction being coincided, and at the center P of the detector S each component of the magnetic field is detected. The detected values corresponding to the X, Y and Z components are mutually independent from the other components and are not at all affected by the variation of the alternating current I flowing through a guidance cable 4 and inductive disturbances.

The detector S is installed on the floor of the vehicle body 1 in a position H (FIG. 3) on the central axis CL of the body in the longitudinal direction so that the direction of the central axis CL and the Y axis of the detector S correspond.

When, for example, an angle between the central axis CL of the vehicle body 1 and the guidance cable 4 (this is called an attitude angle) is $\phi$ and the horizontal distance between the center P of the detector S and the guidance cable 4 (this is called deflection) is l, induced votages $e_{x1}$, $e_{x2}$, $e_{y1}$, $e_{y2}$, $e_{z1}$ and $e_{z2}$ are generated at the coils 7, 8, 9, 10, 11, and 12 of the detector S respectively. If paired coils are connected in series with their winding direction being coincided, the induced voltage of each pair will be expressed by $e_x=e_{x1}+e_{x2}$, $e_y=e_{y2}$, and $e_z=e_{z1}+e_{z2}$ respectively. Using these induced voltages $e_x$, $e_y$, and $e_z$, the attitude angle $\phi$ and the length of deflection l can be expressed by the following equations.

$$\phi = a \operatorname{Tan}^{-1}(e_y/e_x) \quad (1)$$

$$l = b(e_z/e_x)\cos\phi \quad (2)$$

where a and b are constant.

Figure 5:
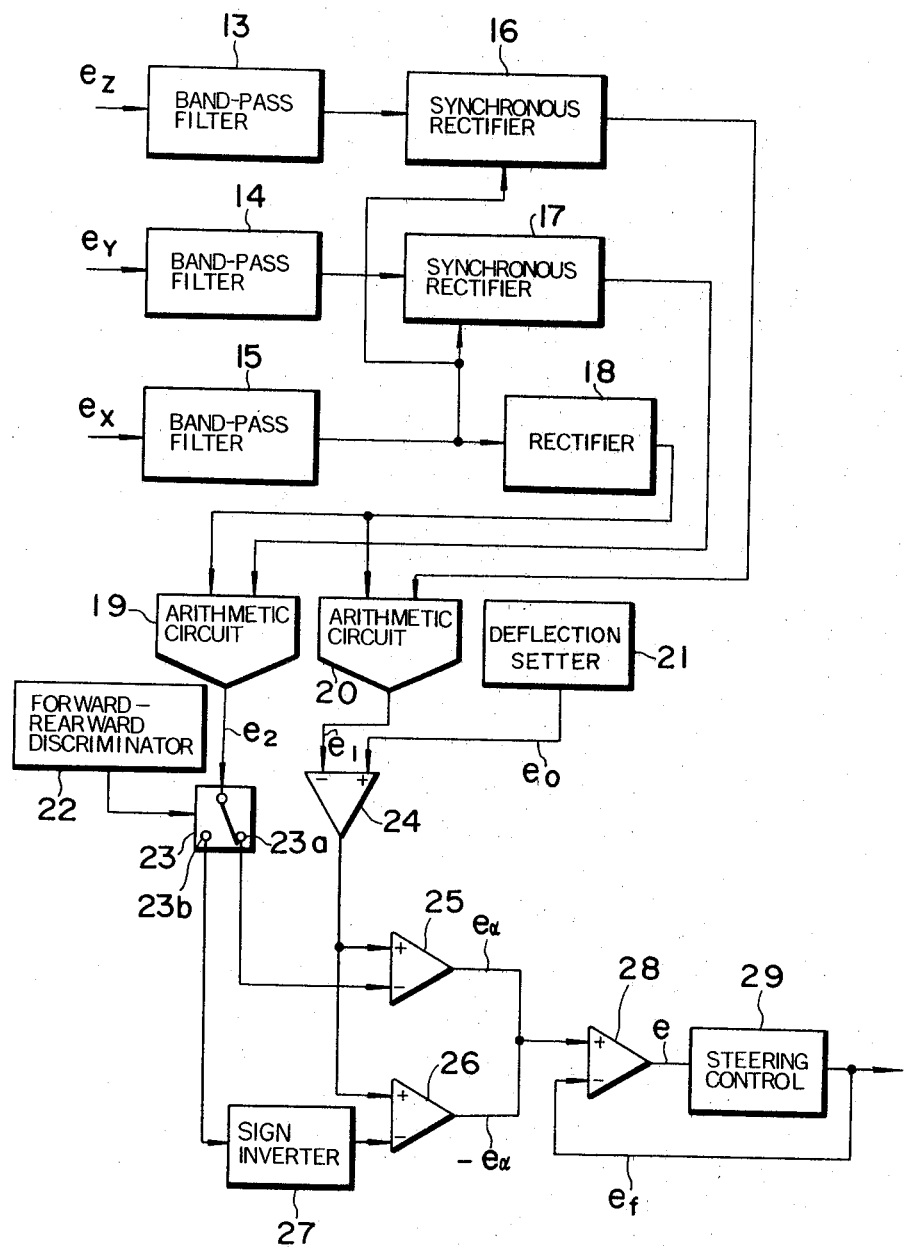
FIG. 5 is a block diagram showing an embodiment of the unmanned vehicle travel control device according to the invention.

Referring now to FIG. 5, noises are removed from the output signals $e_x$, $e_y$, and $e_z$ of the detector S through band-pass filters 15, 14, and 13 respectively. The signal $e_x$ is fed to an arithmetic circuit through a rectifier 18, and the signal $e_y$ is rectified at a synchronous rectifier 16 in synchronism with the signal $e_x$, thereafter being fed to the arithmetic circuit 19. The signal $e_z$ is rectified at a synchronous rectifier 17 in synchronism with signal $e_x$ and is fed to an arithmetic circuit 20. Using the signals $e_y$ and $e_x$, the arithmetic circuit 19 executes the arithmetic operation according to Equation (1) to calculate an attitude angle signal $e_2(e_2=\phi=a\tan^{-1}(e_y/e_x)$, and applies it to a forward-backward switch 23. Using the signals $e_z$ and $e_x$, the arithmetic circuit 20 executes the arithmetic operation according to Equation (2) to calculate a deflection signal $e_1(e_1=1=b(e_z/e_x)\cos\phi)$, and applies it to the negative (−) side input of a differential amplifier 24. A deflection setter 21 presets the deflection of the vehicle body 1 from the guidance cable 4, and applies the deflection set signal $e_0$ to the positive (+) side input of the differential amplifier 24. The differential amplifier 24 amplifies the deviation between the signal $e_1$ and the deflection set value $e_0$ and applies it to the (+) side inputs of differential amplifiers 25 and 26. A forward-backward discriminator 22 discriminates forward-backward movement of the vehicle, and applies a control signal, which switches the forward-backward switch to a contact 23a when the vehicle moves forward and to a contact 23b when the vehicle moves backward, to the forward-backward switch 23. A signal $e_2$ is applied to the (−) side input of the differential amplifier 25 via contact 23a when the vehicle moves forward, and to the (−) side input of the differential amplifier 26 after being fed to a sign inverter 27 via the contact 23b and being inverted thereat when the vehicle moves backward. The differential amplifier 25 applies a deviation signal $e_\alpha$ of deviation of the attitude angle from the attitude angle set value to the (+) side input of a differential amplifier 28 when the vehicle moves forward. The differential amplifier 28 outputs the deviation e between the signal $e_\alpha$ or $-e_\alpha$ and the feedback signal $e_f$, and applies the deviation e to a steering control device 29. The steering control device 29 performs steering control of the vehicle 1 according to the input signal e so that the vehicle 1 runs along the guidance cable 4.

When the steering control is effectuated such that the center line of the vehicle coincides with the guidance cable 4, the deflection set value is zero.

Figure 6:
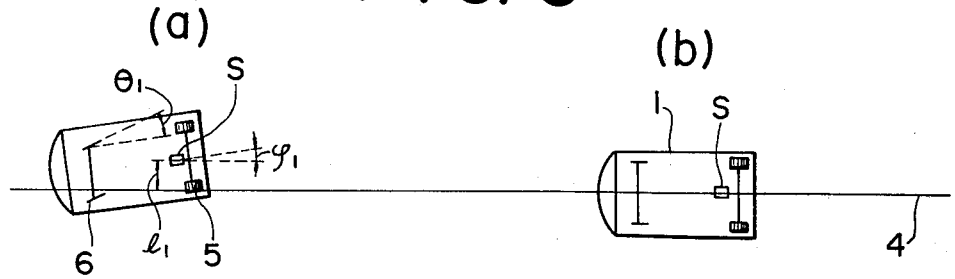
FIG. 6 shows vehicle positions with respect to the guidance cable.

Assume that the position of the detector S of the unmanned vehicle 1 deflects from the guidance cable 4 by the distance $l_1$ and that the attitude angle of the vehicle 1 is $\phi_1$. Then, when the deflection set value is zero, the deflection signal $e_1$ directly becomes the attitude angle set value. A signal representing difference between the attitude angle set value and the attitude angle $\phi_1$ is applied to the (+) side input of the differential amplifier 28 as a steering angle set value, and at the same time a steering angle signal $e_f$ corresponding to the current steering angle $\phi_1$ of the steering wheel 3 is applied to the (−) side input of the differential amplifier 28. The steering angle of the steering wheel 3 is controlled by the output signal of the differential amplifier 28, and both the deflection and the attitude angle change. The deflection signal and the attitude angle signal continue to change according to the steering wheel control until both l and $\phi_1$ become zero, i.e., until the vehicle 1 becomes in a position as shown in FIG. 6(b).

Figure 7:
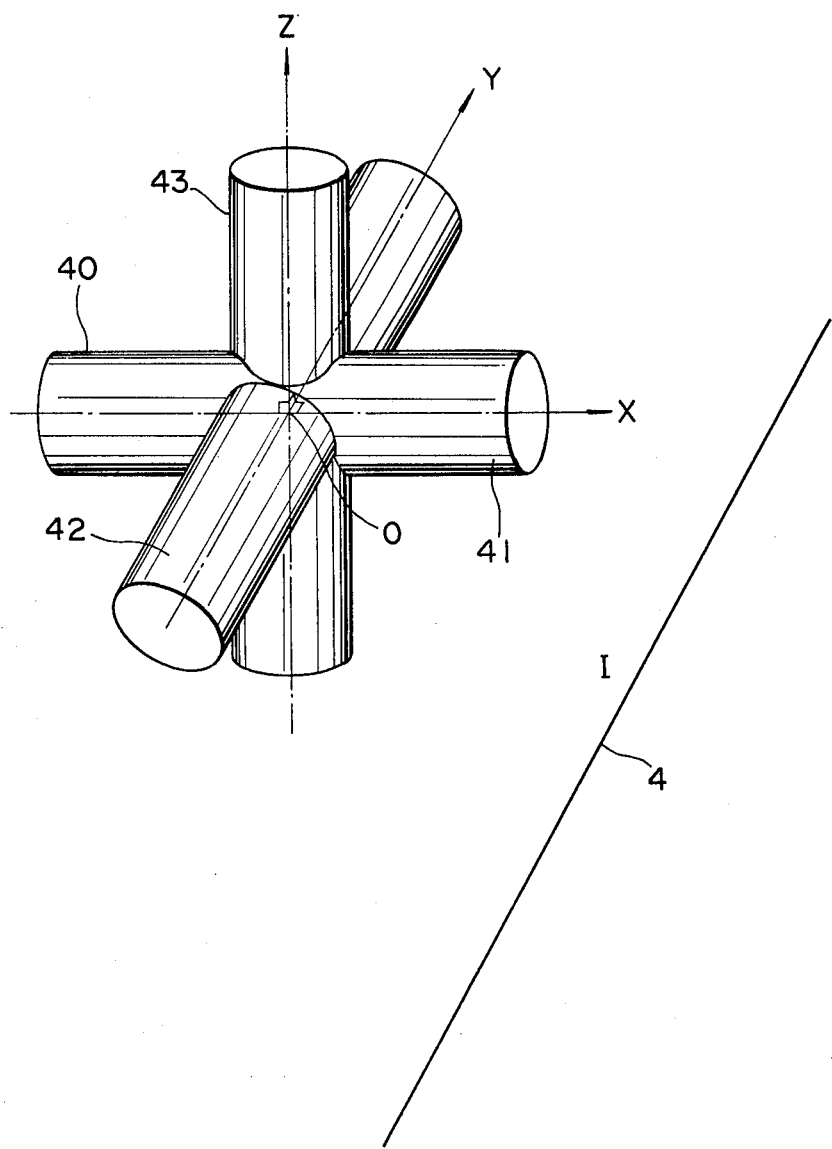
FIG. 7 is a perspective view of another embodiment of the magnetic field detector.
Figure 8:
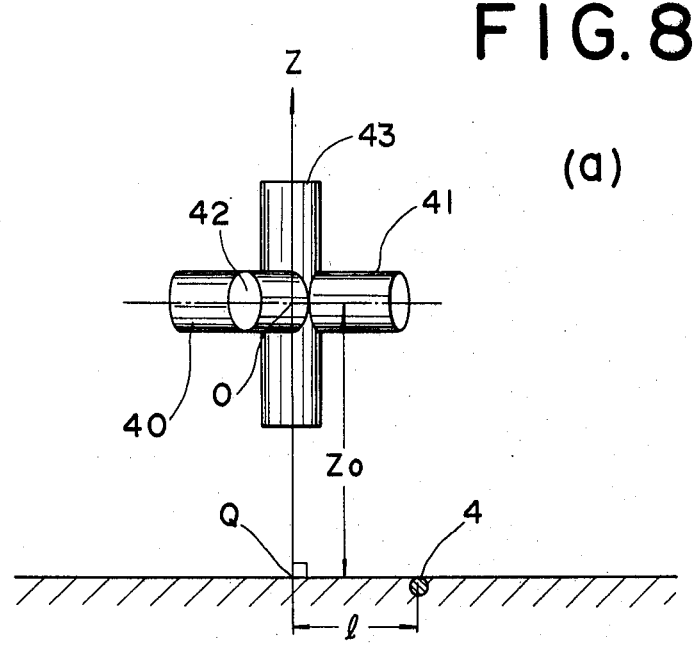
FIG. 8 shows a positional relationship between the magnetic field detector and the guidance cable in FIG. 7.
Figure 8:
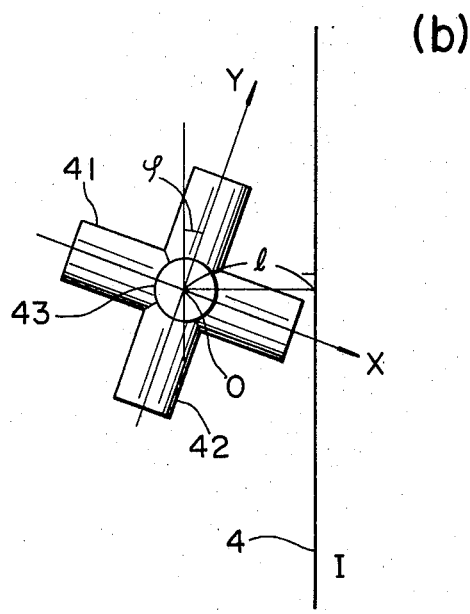

Referring now to FIG. 7, a magnetic field detector 40 is constructed so that the central axes of an X axis coil 41, a Y axis coil 42, and a Z axis coil 43 corresponding to mutually orthogonal axes X, Y, and Z orthogonally intersect with each other at the center O and that these three coils 41 through 43 have the same characteristics. The magnetic field detector 40 moving near the guidance cable 4 detects an induced voltage generated by the induction field resulting from an alternating current I flowing through the guidance cable 4. For example, as shown in FIG. 8(a), the center O of the detector 40 is at a predetermined height Zo above the ground on which the guidance cable is laid, the distance between the point Q (the intersection of Z axis and the ground) and the guidance cable 4 is set at l, and the angle between the central axis, of the Y axis coil 42 and the guidance cable 4 is set at $\phi$ (FIG. 8(b)). Induced voltages generated in the X axis coil 41, the Y axis coil 42, and the Z axis coil 43 by the alternating current ($I = Io \sin \omega t$) flowing through the guidance cable 4 are assumed to be $e_x$, $e_y$, and $e_z$. Then, $e_x$, $e_y$, and $e_z$ are expressed by the following equations.

$$e_x = NA\omega k Io \frac{Zo \cos\phi}{l^2 + Zo^2} \cos\omega t \qquad (3)$$

$$e_y = NA\omega k Io \frac{Zo \sin\phi}{l^2 + Zo^2} \cos\omega t \qquad (4)$$

$$e_z = NA\omega k Io \frac{l}{l^2 + Zo^2} \cos\omega t \qquad (5)$$

where N denotes the number of turns of coil, A represents the sectional area of coil, and k is a constant determined by the coil form and ambient permeability. Similarly, the attitude angle $\phi$ and deflection l can be determined from the induced voltage $e_x$, $e_y$, and $e_z$ by the following equations.

$$(e_y/e_x) = \tan \phi \qquad (6)$$

$$(e_z/e_x) = l/Zo \cos \phi \qquad (7)$$

It is feasible for the deflection detectors constructed with mutually orthogonal coils to be installed in the front and the rear parts of the vehicle body in such an installation, the attitude angle is calculated according to deflection signals outputted from these two detectors, and a steering angle signal is obtained from the calculated attitude angle and the deflections signal of the front side of the vehicle with respect to the travelling direction.

Figure 9:
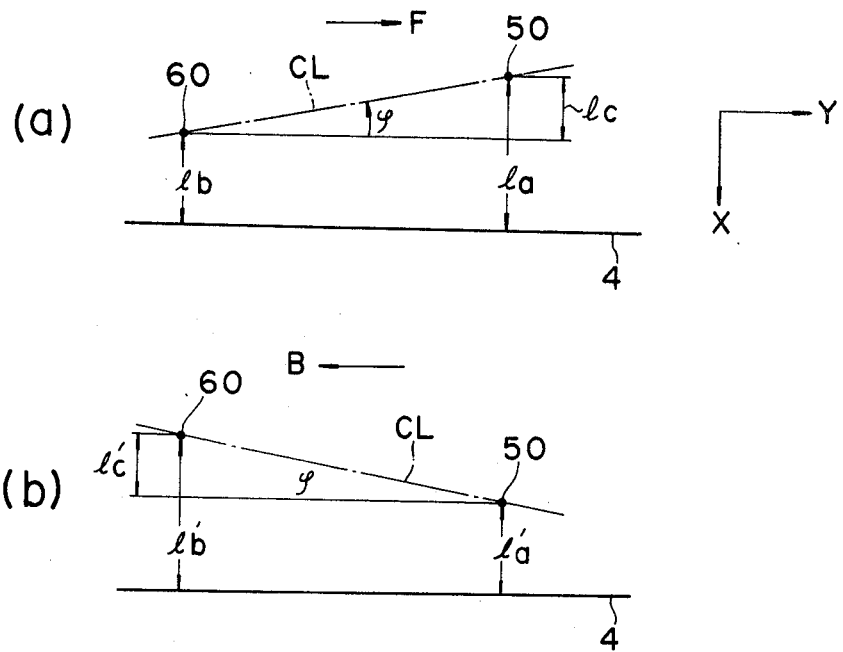
FIG. 9 is a graphical representation for use in detecting the attitude angle of the vehicle against the guidance cable.

In FIG. 9, the vehicle travel direction (the direction of the guidance cable 4) is assumed to be in the Y axis direction, the lateral (traverse) direction is assumed to be the X axis direction, and the vertical direction is assumed to the Z axis direction. Magnetic field detectors 50 and 60 are provided on the center line CL of the front and rear parts of the vehicle body.

In FIG. 9(a), in which the vehicle runs forward (in the direction of arrow F), the center line CL is positioned at an attitude angle of $\phi$ with respect to the guidance cable 4 and the detectors 50 and 60 are positioned at distance $l_a$ and $l_b$ from the guidance cable 4, the following relation is established between the angle $\phi$ and $l_c (= l_a - l_b)$.

$$\phi = K_1 \cdot l_c \qquad (8)$$

where $K_1$ is a constant determined by the vehicle form.

Accordingly, the attitude angle $\phi$ can be determined from $l_c$.

The attitude angle $\phi$ in the case of backward run (FIG. 9(b)) can be similarly calculated by the following equation (9).

$$\phi = K_1' \cdot l_c' \qquad (9)$$

Figure 3:
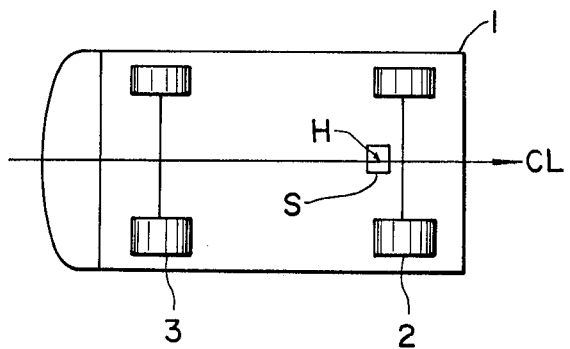
FIG. 3 shows an example of the installation of the magnetic field detector onto the vehicle.
Figure 4:
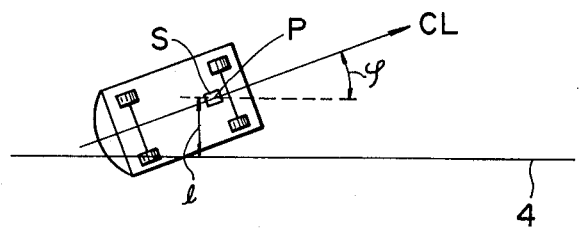
FIG. 4 shows a positional relationship between the vehicle and a guidance cable.

Coefficients $K_1$ and $K_1'$ in Equations (8) and (9) are generally not the same. This is due to structural reasons, for example, the positionable relationship between a rigid wheel 2 and a steering wheel 3 is reversed when the vehicle travels backwardly as seen in FIG. 3.

Figure 10:
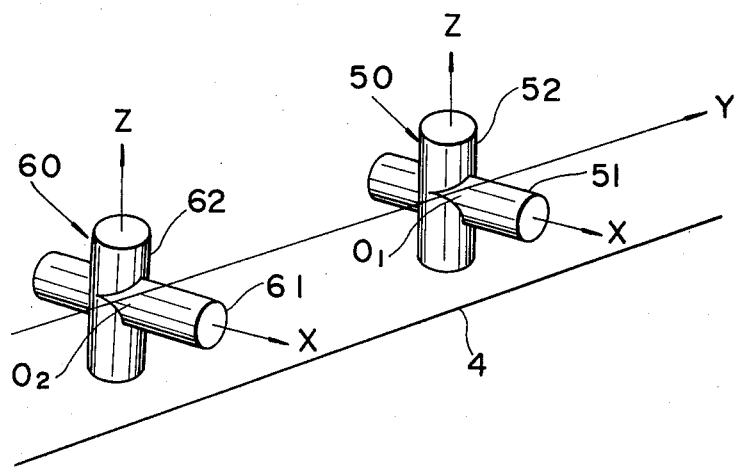
FIG. 10 is a perspective view of the magnetic field detector for executing the attitude angle detection shown in FIG. 9.

In FIG. 10, a magnetic field detector 50 is constructed by orthogonally intersecting two coils 51 and 52 and the coils 51 and 52 are arranged so that the axial direction of the coil 51 corresponds to the horizontal (X axis) direction and that of the coil 52 to the vertical (Z axis) direction. The distance between the center $O_1$ of the detector 50 and the guidance cable 4 is taken to be h. The center $O_1$ coincides with the centers of the coils 51 and 52.

Figure 11:
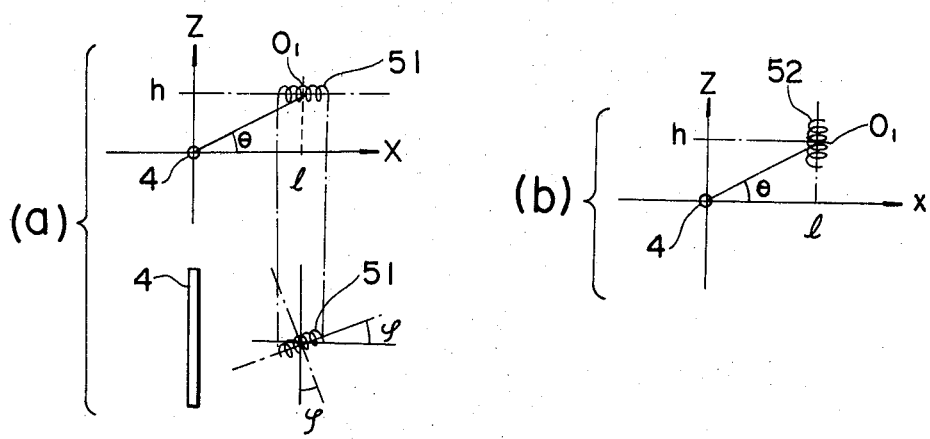
FIG. 11 illustrates the principle of detection by the detector shown in FIG. 10.

When the attitude angle of the coil 51 is $\phi$ (i.e., the axial direction of the coil 51 is at an angle $\phi$ with the X axis direction) with respect to the guidance cable 4 and the center $O_1$ is located at a horizontal distance l from the guidance cable 4 as shown in FIG. 11(b), a voltage $e_a$ to be induced in the coil 51 is given by the following expression.

$$e_a = K_2 \frac{1}{\sqrt{h^2 + l^2}} \sin\theta \cdot \cos\phi \qquad (10)$$

$$= K_2 \frac{1}{\sqrt{h^2 + l^2}} \cdot \frac{h}{\sqrt{h^2 + l^2}} \cos\phi$$

$$= K_2 \frac{h}{h^2 + l^2} \cos\phi$$

The voltage $e_a$ becomes maximum when the center $O_1$ of the coil 51 is in the same vertical plane with the guidance cable 4 and the axial direction thereof coincides with the X axis direction. This voltage $e_a$ is hereafter referred to as a reference voltage.

When the center $O_1$ of the coil 52 is positioned at a horizontal distance l from the guidance cable 4 as shown in FIG. 11(b), a voltage $e_b$ induced in the coil 52 is given by the following equation.

$$e_b = K_3 \frac{1}{\sqrt{h^2 + l^2}} \cos\theta \qquad (11)$$

$$= K_3 \frac{1}{\sqrt{h^2 + l^2}} \cdot \frac{l}{\sqrt{h^2 + l^2}}$$

$$= K_3 \frac{l}{h^2 + l^2}$$

where $K_2$ and $K_3$ are constants.

The voltage $e_b$ is a function of the horizontal distance l alone and is independent of the angle $\phi$. As apparent from Equation (10), the voltage $e_b$ does not relate to the distance l linearly, and therefore cannot be used directly as a control deflection signal.

To establish linearity, this voltage $e_b$ is divided by the above-mentioned reference voltage $e_a$ as follows.

$$Va = \frac{e_b}{e_a} = K_4 \frac{l}{h\cos\phi} \qquad (12)$$

where $K_4$ is a constant.

When the angle $\phi$ is fixed, Va linearly varies with the distance l. Accordingly, Va is used as a deflection signal.

A magnetic field detector 60 is structured totally identical with the detector 50 and induced voltages $e_a$ and $e_b$ in coils 61 and 62 are the same as the induced voltages $e_a$ and $e_b$ in the coils 51 and 52. A deflection signal Vb is given by the following expression.

$$Vb = \frac{e_d}{e_c} = K_5 \frac{l}{h\cos\phi} \quad (13)$$

where $K_5$ is a constant.

A steering angle signal SS is produced by adding the angle $\phi$ given by Equation (8) to the deflection signal outputted from the detector positioned at the front part in the vehicle travel direction, i.e., a deflection signal Va in the case of forward run and a deflection signal Vb in the case of backward run.

Figure 12:
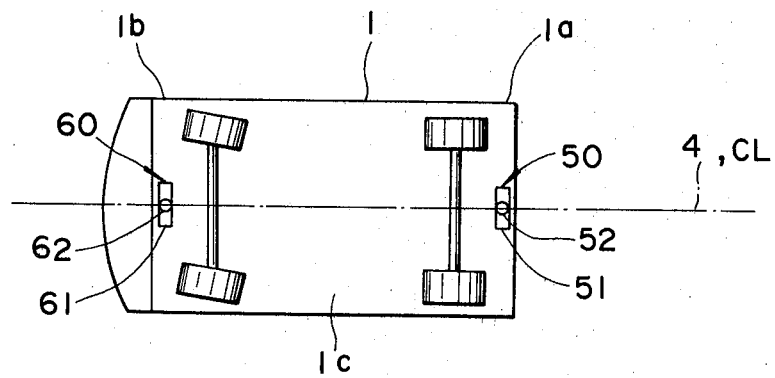
FIG. 12 shows an example of the installation of the detector shown in FIG. 10 onto the vehicle.

These detectors 50 and 60 are provided on the floor 1C of the vehicle body 1 as shown in FIG. 12. That is, the detectors 50 and 60 are provided at specified points of the front part 1a and rear part 1b respectively on the center line of the vehicle body 1 with the axial directions of the coils 51 and 61 brought to coincide with the X axis directions and the axial directions of the coils 52 and 62 brought to coincide with the Z axis direction. Since the vehicle floor 1C and the travel course surface (not shown) are in parallel, the coils 51 and 61 are in parallel with the course surface, while the coils 52 and 62 are vertical to the surface.

Figure 13:
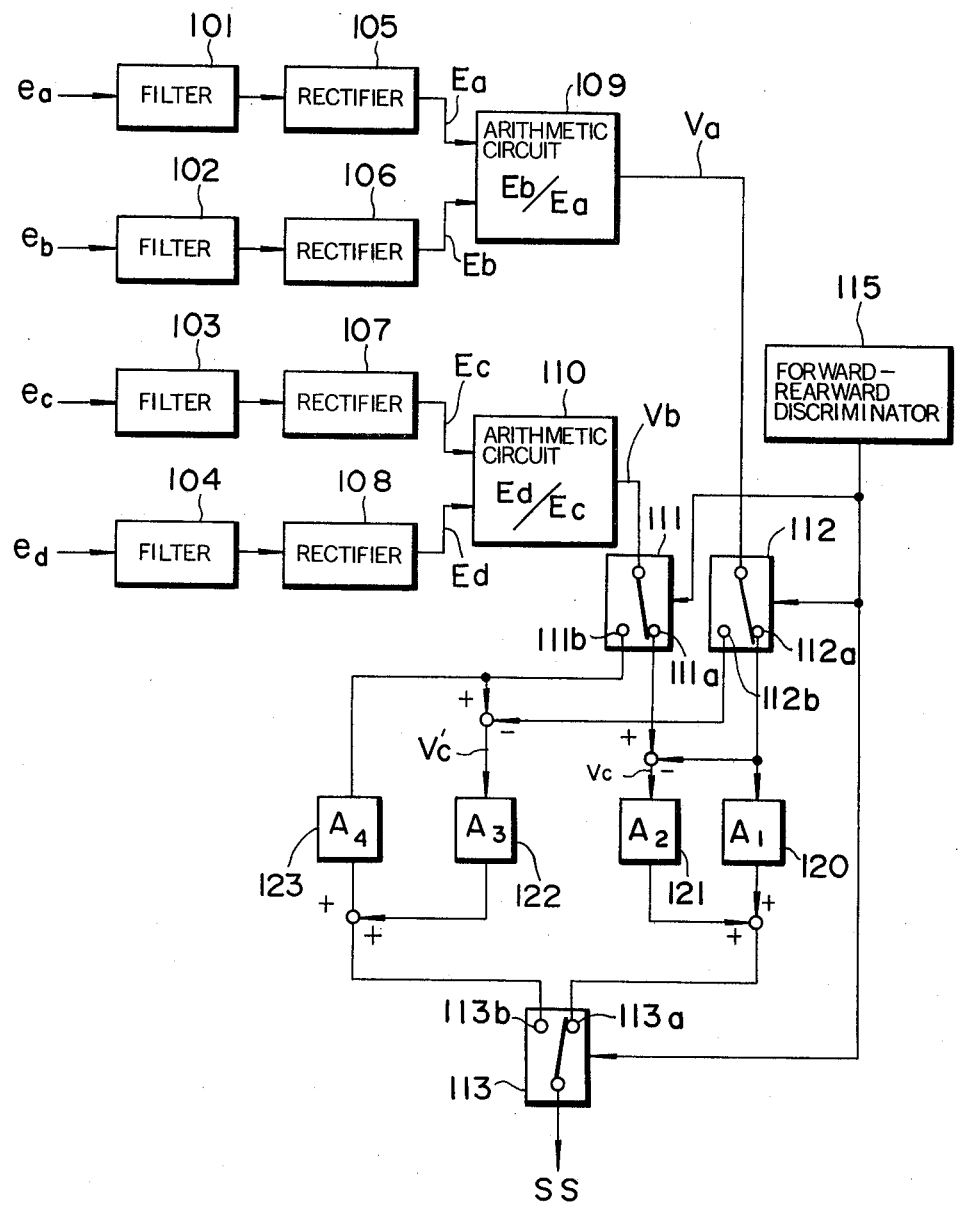
FIG. 13 is a block diagram showing an embodiment of the steering angle setting signal forming circuit.

In FIG. 13, voltage signals $e_a$ through $e_d$ outputted from the detectors 50 and 60 are respectively fed to band-pass filters 101 through 104 to remove their noise components, are fed to rectifiers 105 through 108 respectively for the rectification, and then are outputted as signals Ea through Ed respectively.

An arithmetic circuit 109 performs the division (Eb/Ea) in Equation (12) based on the signals Ea and Eb, calculates deflection $l_a$ from the guidance cable 4 to the center $O_1$ of the detector 50, and outputs a corresponding deflection signal Va. An arithmetic circuit 110 performs the arithmetic operation of Equation (13) based on the signals Ec and Ed, calculates the deflection $l_b$ between the center $O_2$ of the detector 60 and the guidance cable 4, and outputs a corresponding deflection signal Vb. These deflection signals Va and Vb are fed to change-over switches 111 and 112, respectively.

A forward-rearward discriminator 115 discriminates the forward and backward movements of the vehicle, and outputs a signal "1" in the case of the forward movement, and "0" in the case of the backward movement. This forward-rearward discriminator 115 comprises, for example, a pulse encoder and a flip-flop circuit (both not shown), detects the rotational direction of wheels by the pulse encoder, obtains two pulse signals having 90-degree phase difference, turns the flip-flop circuit to set state by one pulse signal when the vehicle moves forward thereby making the output signal thereof "1," and resets the flip-flop circuit by the other pulse signal when the vehicle moves backward thereby making the output signal "0".

When receiving a signal "1" from the forward-rearward discriminator 115, the change-over switches 111, 112, and a change-over switch 113 change their contacts to contacts 111a, 112a, and 113a respectively, while when a signal "0" is fed, these switches are changed to contacts 111b, 112b, and 113b.

Assume that, while the vehicle is running forward, the detectors 50 and 60 provided in the front and the rear parts of the vehicle body 1 have deflected from the guidance cable by horizontal distance $l_a$ and $l_b$ respectively and the attitude angle is $\phi$. Then, from the coils 51, 52, 61, and 62 of the detector 50 and 60 are outputted signals $e_a$ through $e_d$ corresponding to the distances $l_a$ and $l_b$, and from rectifiers 105 through 108 are outputted signals Ea through Ed. Arithmetic circuits 109 and 110 perform divisions (Eb/Ea) and (Ed/Ec) based on the signals Ea, Eb, Ec, and Ed, and output error signals Va and Vb corresponding to distances $l_a$ and $l_b$.

In the meantime, the change-over switches 111, 112, and 113 are switched to the contacts 111a, 112a, and 113c respectively, and deflection signals Va and Vb are outputted through the contacts 111a and 112a. Then, the deviation Vc between the deflection signals Va and Vb are calculated. An amplifier 120 amplifies the deflection signal Va according to a predetermined amplification factor $A_1$. An amplifier 121 amplifies the deviation Vc according to an amplification factor corresponding to the coefficient $K_1$ in Equation (8), and outputs an angle signal corresponding to the angle $\phi$. A sum of the deflection signals and the attitude angle signal outputted from the amplifiers 120 and 121 is outputted through the contact 113a of the changeover switch 113 as a steering angle signal SS.

When the vehicle runs backward (FIG. 9(b)), the switches 111, 112, and 113 are changed to the contacts 111b, 112b, and 113b respectively, and deflection signals Vb' and Va' corresponding to distances $l_b$' and $l_a$' between the detectors 60 and 50 and the guidance cable 4 are outputted through the contacts 111b and 112b respectively. An amplifier 122 amplifies the deviation Vc' between the deflection signals Vb' and Va' according to an amplification factor $A_3$ corresponding the coefficient $K_1'$ in Equation (9), and outputs an angle signal. The amplifier 122 amplifies the signal Vb' according to a predetermined amplification factor $A_4$ and outputs it. A sum of the angle signal and deflection signals outputted from the amplifiers 121 and 122 are outputted as a steering angle signal through the contact 113b of the switch 113.

The steering angle control device 29 (FIG. 6) controls the steering angle of the steering wheel 3 (FIG. 3) by means of a steering angle signal SS and controls the vehicle to run along the quidance cable 4.

Though ordinary rectifiers 105 through 108 are used in this embodiment, synchronous rectifiers may be used for the rectifiers 106 through 108 and the signals $e_b$ and $e_d$ may be synchronous-rectified by means of reference signals $e_a$ and $e_c$.

A DC generator may be used as a forward-backward discriminator for generating a positive or negative voltage in accordance with the normal or reverse direction of the wheel turns, thus the distrimination between the forward and backward movements being made from the polarity of the generated voltage.

Though a magnetic field detector structured by a plurality of mutually orthogonal coils is used in the embodiment, magnetic field detectors of other type may be used. A magnetic field detector structured by a plurality of coils intersecting at a predetermined angle or a plurality of coils arranged in a specified form may be used. In other words, a magnetic field detector of any type may be used provided that it can detect desired components among induction field components.

What is claimed is:

1. An unmanned vehicle travel control device for performing steering control by means of induction field comprising:
   a detector for outputting a deflection signal and an attitude angle signal through detecting the deflection of a vehicle from a guidance cable and an attitude angle;
   deflection setter means for outputting a deflection setting signal representing a preset deflection of the vehicle body from the guidance cable,
   first signal forming means for forming an attitude angle setting signal based on the deviation between said deflection setting signal and said deflection signal;
   second signal forming means for forming a steering angle setting signal based on the deviation between said attitude angle setting signal and said attitude angle signal; and
   a steering control device for performing steering control by means of said steering angle setting signal.

2. An unmanned vehicle travel control device according to claim 1, wherein said first signal forming means includes a coefficient multiplier.

3. An unmanned vehicle travel control device according to claim 2, wherein said second signal forming means includes a coefficient multiplier.

4. A device according to claim 1 wherein said detector comprises a magnetic field detector comprising three paired coils, wherein each coil in a pair is arranged in parallel spaced with a predetermined distance, each pair of coils is arranged in mutually orthogonal three axial directions respectively, said paired coils are assembled so that each pair of coils in the same axial direction embrace the other pairs of coils in the other axial directions, and each pair of coils in the same axial direction are connected in series, whereby the components in the three directions of the induction field formed by the guidance cable are detected.

* * * * *